United States Patent Office 3,532,485
Patented Oct. 6, 1970

3,532,485
METHOD FOR ENHANCING PLANT GROWTH
George Dunning Stevens, Rte. 1, Box 45,
Marinette, Wis. 54143
No Drawing. Continuation-in-part of application Ser. No. 609,709, Dec. 27, 1966. This application Aug. 4, 1969, Ser. No. 856,230
Int. Cl. A01c 21/00
U.S. Cl. 71—1                 3 Claims

ABSTRACT OF THE DISCLOSURE

This invention relates to plant nutrient compositions containing carbon dioxide in solution and to methods of utilizing these compositions for increased plant growth by application to either roots or leaves. Nutrient precipitation problems encountered in soilless growth of plants are prevented by the increased solubility of essential elements in the disclosed compositions, which also provide a more efficient method of supplying the increased quantities of carbon dioxide necessary for optimum photosynthesis.

BACKGROUND OF INVENTION

This application is a continuation-in-part of application Ser. No. 609,709 filed Dec. 27, 1966, and now abandoned Growing plants utilize a number of chemical elements in their growth processes. Through the absorption and conversion of light energy in the process known as photosynthesis, these elements are converted to food and fiber products of which carbohydrates, i.e.; sugars, starches, and cellulose are in the majority, although many other compounds, such as amino acids, proteins, and vitamins are also formed.

The elements necessary in major quantities for proper plant nutrition are nitrogen, potassium, phosphorous, calcium, magnesium, and sulfur. These elements are often termed the major elements. In addition, several other chemical elements, sometimes termed minor or trace elements, are also essential to plant nutrition. These are boron, manganese, iron, zinc, copper, cobalt, and molybdenum. Sodium and chlorine are also required by plants in small amounts, but these elements are usually ubiquitous to any plant environment.

In spite of considerable investigation of plant physiology, it is still not known exactly how all of these elements are used by the growing plant, although it is believed that many of the trace elements act as catalysts for the various biochemical reactions that take place during photosynthesis. Because of the present limited knowledge of plant physiology, it is probable that other chemical elements will eventually be found to be essential to plant growth in even smaller quantities than is presently deemed necessary for the trace elements I have named.

However, the major weight of a plant is not composed of any of the chemical elements which I have previously mentioned. Instead, the living plant is composed mainly of the elements carbon, hydrogen, and oxygen, which are present in the plant as water and carbohydrates. Hydrogen and oxygen are supplied from the water absorbed by the plant roots. Carbon is supplied from the carbon dioxide contained in the air surrounding the plant.

Plants are usually grown in soil because it acts as a reservoir of the necessary chemical elements as well as a reservoir of water. But soil itself is not necessary to the growth of plants because all of the essential elements can be supplied to the plant roots via a carefully balanced chemical nutrient solution. In fact, soilless, or hydroponic growth of plants offers several advantages over soil growth, particularly in regard to control of the chemical nutrients and in optimum conditions of water supply.

Adequate light is seldom a problem so the if growing plants are supplied all of the essential chemical elements necessary for growth together with all of the water needed, their growth will be carbon-limited because the average amount of carbon dioxide in the atmosphere is only 0.03 percent by volume. It has been found, particularly in closed systems such as commercial greenhouses, that the atmosphere rapidly becomes depleted of carbon dioxide soon after the sun rises and active photosynthesis begins. Growth of plants is greatly slowed by this lack of carbon dioxide, and many methods to supplement the carbon dioxide level have been developed. These methods consist either of burners which totally combust petroleum gases such as propane or butane to yield carbon dioxide as one of the combustion products, or simply tanks of liquid carbon dioxide from which the gas is metered to the greenhouse atmosphere.

The first method requires expensive burning equipment and results in heat which is often undesirable. The purity requirements of the fuel to be burned are very high in order that detrimental contaminents will not be produced in the burning process. Cylinders of liquid carbon dioxide provide a cool, clean source, but are usually quite expensive. Both methods suffer from the fact that the percentage of carbon dioxide in the entire greenhouse atmosphere must be raised and much of the gas is wasted by ventilation and air leaks. Moreover, too high a concentration of carbon dioxide in the air produces a toxic reaction in the plants.

A major problem in soilless or hydroponic culture is the problem of keeping the trace elements in the nutrient solution in a soluble form in which they can be absorbed by the plant roots. The trace elements precipitate from an alkaline nutrient solution. The nutrient solution, even though neutral when originally prepared, becomes alkaline as preferential uptake of mineral elements by the plants takes place.

For example, as preferential uptake of nitrogen by plants takes place from a solution of potassium nitrate, the solution becomes more alkaline as the remaining potassium ion is converted to the alkaline compound, potassium hydroxide.

Sulfuric and phosphoric acids have been utilized to acidify nutrient solutions for hydroponic growth, but strong acids present the danger of over-acidification and also tend to throw the nutrient solution out of balance with respect to sulfur or phosphorous.

SUMMARY OF THE INVENTION

This invention provides improved compositions for nutrient solutions for use in plant growth by soilless methods as well as by the usual methods of soil culture. The invention also provides improved methods for preparation of optimum and properly balanced plant nutrient solutions for stimulation of plant growth, whether in soil or soilless culture, as well as improved methods for applying nutrient solutions to either roots or leaves of the growing plant. In particular, the invention provides an improved method for supplying supplemental carbon dioxide to growing plants in order to greatly increase the rate of their photosyntheic processes.

DESCRIPTION OF THE PREFERRED EMBODIMENTS

The improvements with which this invention is concerned are accomplished through the utilization of carbon dioxide as a component of a plant nutrient system containing the essential elements for plant growth as is detailed in the following description and examples.

I have found that the addition of carbon dioxide to a plant nutrient solution constitutes a major improvement in the preparation of such solutions and enhances the subsequent growth of plants, particularly in soilless culture.

I have also found that the foliar application of nutrient solutions containing carbon dioxide results in a method which enables the rapid and economical utilization of carbon dioxide by growing plants. The nutrient solution is prepared by contacting an aqueous liquid phase with carbon dioxide gas at a pressure of from more than one atmosphere to 25 atmospheres to dissolve from more than three grams to 50 grams of carbon dioxide per liter of solution.

The acid carbonates of the trace elements necessary for plant nutrition are much more soluble than their hydroxides. By adding carbon dioxide to a freshly prepared nutrient solution, the majority of the trace elements are converted to their acid carbonates and a stable nutrient solution is thereby formed. Carbon dioxide is easily added to the nutrient solution in gaseous form with little chance of over-acidification of the nutrient solution.

The following example illustrates the preparation of a typical plant nutrient solution utilizing carbon dioxide. It should not be considered as limiting the range of elemental components or concentrations because a number of published nutrient formulas differing only in chemical source of essenital elements or in concentrations of these sources will yield the same result in combination with carbon dioxide.

EXAMPLE 1

A nutrient solution was prepared for use in the soilless growth of plants which had the following composition.

| Compound: | Concentration, grams/liter |
|---|---|
| Magnesium sulfate: $MgSO_4 \cdot 7H_2O$ | 1.06 |
| Potassium phosphate: $KH_2PO_4$ | 0.35 |
| Potassium nitrate: $KNO_3$ | 1.41 |
| Calcium nitrate: $Ca(NO_3)_2 \cdot 5H_2O$ | 2.12 |

To a 2 liter quantity of this major element nutrient solution was added 3 milliliters of the following trace element solution.

| Compound: | Concentration, grams/liter |
|---|---|
| Boric acid: $H_3BO_4$ | 6.73 |
| Manganese sulfate: $MnSO_4 \cdot H_2O$ | 4.86 |
| Copper sulfate: $CuSO_4 \cdot 5H_2O$ | 0.25 |
| Molybdic acid: $MoO_3$ | 0.75 |
| Cobalt nitrate: $Co(NO_3)_2 \cdot 6H_2O$ | 2.50 |
| Zinc acetate: $Zn(CH_3COO)_2 \cdot 2H_2O$ | 1.68 |

To the combined solutions was then added 2 milliliters of a solution containing 189 grams per liter of chelated iron. The iron chelate was sodium ferrous ethylenediamine tetraacetate containing 10% iron as Fe.

Within a few minutes the solution became cloudy as a precipitate formed, and after standing overnight most of the precipitate settled to the bottom of the container. The pH of the solution was 7.2. When tomato plants were grown in this solution by soilless culture methods, they began to develop symptoms of trace element deficiency within about 3 weeks. For example, iron deficiency was manifested by interveinal leaf chlorosis, especially on young leaves, with the veins remaining green. Manganese deficiency was manifested by small brown necrotic spots following original chlorosis.

Another solution was prepared with the same quantities of chemical compounds described previously, but this solution was carbonated by bubbling carbon dioxide gas through the solution for 5 minutes immediately following the addition and mixing of all the chemical compounds. The pH of this solution was 5.2. After 24 hours no measurable precipitate was noted in the carbonated solution.

The previous example indicates a method of keeping the minor elements from precipitating and thereby becoming unavailable to plants by means of a complete nutrient solution composition. The minor elements may also be separated from the major nutrient elements and applied to the leaves of the plant.

EXAMPLE 2

A minor element solution was prepared according to the composition described in Example 1. Twenty ml. of this solution and 20 ml. of the chelated iron solution also described in Example 1 were transferred to a pressure vessel which was fitted with a valve for pressurizing with gas and with a flexible hose and spray nozzle for application of solution. Carbon dioxide was added to the vessel until the pressure remained at 100 pounds per square inch. Usually two or three additions were required because the pressure fell as the carbon dioxide dissolved in the nutrient solution and more carbon dioxide was required to establish a pressure of 100 p.s.i. over the solution. A carbon dioxide pressure as great as 25 atmospheres may be employed. The weight of carbon dioxide added to the solution ranged from more than 3 grams per liter to 50 grams per liter. The unit then comprised a stored-pressure spraying system for applying the minor element solution to the foliar portions of plants.

Tomato plants growing in a nutrient solution prepared as described in Example 1, but without the addition of minor elements, were sprayed several times daily in conditions of bright sunlight with the highly carbonated minor element solution from the pressurized sprayer. This treatment was applied throughout the life of the tomato plants. Surprisingly, no harmful effects on the foliar portions of the plants were noted from the acid spray solution. Instead, the plants exhibited a maximum growth rate, and developed no symptoms of trace element deficiency.

Carbon dioxide applied as a carbonated solution directly to a growing plant leaf is absorbed much more efficiently than when it is merely present in the surrounding atmosphere. Until the spray droplets of carbonated solution are entirely evaporated, a solution saturated with carbon dioxide is present in close proximity to the leaf stomata which normally absorb atmospheric carbon dioxide.

Both carbon dioxide and essential plant nutrient elements may be easily applied by such a pressurized system at the most convenient and optimum time for rapid assimilation of both by the growing plant, that is, in conditions of rapid growth and active photosynthesis. In addition, carbon dioxide pressure may itself be used for the source of spray propellant. Thus an aerosol package may be provided for stimulating the growth of plants which has the simultaneous advantages of minor element feeding plus the additional growth-stimulating effects of carbon dioxide.

Although the carbonated and pressurized aerosol has specific advantages in the prevention of minor element precipitation, a complete plant nutrient solution containing both major and minor essential elements may also be utilized as described in the following example.

EXAMPLE 3

The complete plant nutrient solution described in Example 1 which contained both major and minor elements in combination was transferred immediately after mixing to a pressure container and carbon dioxide was added until the gauge pressure remained at 100 pounds per square inch. The resulting self-contained spraying system was fitted with a flexible hose and spray nozzle. The unit was used to spray the foliar portions of plants growing both in soil and by soilless culture methods. All of these plants exhibited a maximum growth rate in response to repeated applications of the complete plant nutrient solution. The response shown by plants growing in poor or nutrient-depleted soil was particularly noteworthy for its beneficial effect.

Although the described improvements in plant nutrient solutions and methods are especially applicable to the soilless or hydroponic growth of plants, this invention should not be considered as limited to soilless methods alone, as all of the nutrient solution compositions and methods of application may be applied as well to plants growing in soil, either in greenhouses or under field conditions.

I claim:

1. A method of growing plants which comprises the step of applying to the plant foliage an aqueous nutrient solution having carbon dioxide in an amount of from more than 3 grams to 50 grams per liter of solution.

2. A method of promoting the growth of plants which comprises the step of applying to the foliage of the plants an aqueous solution containing a member selected from the group consisting of boron, copper, cobalt, iron, manganese, molybdenum, zinc, and a mixture thereof and an amount of carbon dioxide of from more than 3 grams to 50 grams per liter of solution.

3. A method of promoting the growth of plants which comprises adding the major elements for plant nutrition to the root systems of the plants by means of a plant nutrient solution containing N, K, P, Mg, Ca, and S; together with a foliar application of the trace elements iron, manganese, copper, cobalt, molybdenum, zinc and boron in an aqueous solution containing carbon dioxide in an amount from more than 3 grams to 50 grams per liter of solution.

References Cited

UNITED STATES PATENTS

| 2,350,982 | 6/1944 | Borst | 71—1 |
| 3,197,302 | 7/1965 | MacBride | 71—63 |
| 3,250,606 | 5/1966 | Murray | 71—1 |

JAMES L. DE CESARE, Primary Examiner

U.S. Cl. X.R.

71—63